US012090119B2

(12) United States Patent
Pearce

(10) Patent No.: US 12,090,119 B2
(45) Date of Patent: Sep. 17, 2024

(54) METHOD OF PACKAGING A TWO COMPONENT COMPOSITION INTO A DUAL VIAL

(71) Applicant: Pacifi Limited, Cobham (GB)

(72) Inventor: Gareth Pearce, Cobham (GB)

(73) Assignee: Pacifi Limited, Cobham (GB)

( * ) Notice: Subject to any disclaimer, the term of this patent is extended or adjusted under 35 U.S.C. 154(b) by 260 days.

(21) Appl. No.: 16/959,545

(22) PCT Filed: Jan. 7, 2019

(86) PCT No.: PCT/GB2019/050032
§ 371 (c)(1),
(2) Date: Jul. 1, 2020

(87) PCT Pub. No.: WO2019/135093
PCT Pub. Date: Jul. 11, 2019

(65) Prior Publication Data

US 2021/0069062 A1 Mar. 11, 2021

(30) Foreign Application Priority Data

Jan. 5, 2018 (GB) ..................................... 1800207

(51) Int. Cl.
*B65B 7/16* (2006.01)
*A61J 1/06* (2006.01)
(Continued)

(52) U.S. Cl.
CPC ............. *A61J 1/2027* (2015.05); *A61J 1/065* (2013.01); *A61J 1/2093* (2013.01); *B65B 7/161* (2013.01);
(Continued)

(58) Field of Classification Search
CPC ......... B65B 3/003; B65B 3/006; B65B 3/326; B65B 7/161; B65B 29/10; B65B 2230/02;
(Continued)

(56) References Cited

U.S. PATENT DOCUMENTS 1,585,911 A * 5/1926 Heublein ........... B65D 81/3277
604/416
1,626,338 A * 4/1927 Heublein ........... A61K 51/1289
422/903
(Continued)

FOREIGN PATENT DOCUMENTS

DE 378630 C * 7/1923 ......... B65D 81/3277
EP 2910532 A1 8/2015
(Continued)

OTHER PUBLICATIONS

Indian hearing notice dated Mar. 20, 2024.
Machine translation of EP0854911.

*Primary Examiner* — Stephen F. Gerrity
(74) *Attorney, Agent, or Firm* — Woodard Emhardt Henry Reeves & Wagner

(57) ABSTRACT

A method of packaging a two component composition into a dual vial (100), wherein the dual vial (100) comprises a single continuous piece of material arranged to provide both a first vial (110) and a second vial (120), the method comprising providing a second component of the composition into a volume, of the second vial (120), surrounding the first vial (110), providing a first component of the composition into a first vial (110), wherein the first vial (110) is nested within a second vial (120), and closing the first vial (110) and the second vial (120).

18 Claims, 11 Drawing Sheets

(51) Int. Cl.
*A61J 1/20* (2006.01)
*B65B 7/28* (2006.01)
*B65B 29/10* (2006.01)

(52) U.S. Cl.
CPC ................ *B65B 7/164* (2013.01); *B65B 7/28* (2013.01); *B65B 29/10* (2013.01)

(58) Field of Classification Search
CPC ........ A61J 1/065; A61J 1/2027; A61J 1/2093; B65D 81/3277; A61M 5/286; C03B 23/18
See application file for complete search history.

(56) References Cited

U.S. PATENT DOCUMENTS

| | | | | | |
|---|---|---|---|---|---|
| 1,674,928 | A * | 6/1928 | Smith | B65D 81/3277 604/416 |
| 1,922,811 | A * | 8/1933 | Kabnick | B65D 81/3277 604/416 |
| 1,943,120 | A * | 1/1934 | Kabnick | A61M 5/284 604/87 |
| 2,082,915 | A * | 6/1937 | Sontag | B65D 81/3277 604/291 |
| 2,153,594 | A * | 4/1939 | Saffir | A61M 5/2429 604/203 |
| 2,175,365 | A * | 10/1939 | Saffir | A61J 1/062 604/232 |
| 2,494,456 | A | 1/1950 | Slill | |
| 2,815,755 | A * | 12/1957 | Anastor | B65D 81/32 65/36 |
| 3,340,873 | A * | 9/1967 | Solowey | A61J 1/2093 604/416 |
| 6,544,213 | B1 * | 4/2003 | Lifshey | A61J 1/067 604/89 |
| 6,571,580 | B1 * | 6/2003 | Lodge | B01L 3/5082 65/58 |
| 2015/0140241 | A1 | 5/2015 | Hosseini | |
| 2015/0225095 | A1 | 8/2015 | Py | |
| 2017/0224586 | A1 | 8/2017 | Tsakas | |

FOREIGN PATENT DOCUMENTS

| | | | | |
|---|---|---|---|---|
| GB | 101664 | A * | 10/1916 | B65D 49/00 |
| GB | 0332827 | | 7/1930 | |
| GB | 350903 | | 6/1931 | |
| GB | 1375681 | | 11/1974 | |
| WO | WO 97/11155 | | 3/1997 | |
| WO | WO 2016/007843 | A1 | 1/2016 | |

* cited by examiner

METHOD OF PACKAGING A TWO COMPONENT COMPOSITION INTO A DUAL VIAL

FIELD

The present disclosure relates to packaging, and more particularly to packaging of two component compositions, such as medicaments and other compositions, and to methods for packaging such compositions.

BACKGROUND

Ampoules are commonly used to contain pharmaceuticals and chemicals that must be protected from air, water and contaminants. They are generally made from glass tubes which are hermetically sealed by melting and drawing apart the thin glass of the tube with an open flame. They are usually opened by snapping off the neck. If properly done, this last operation creates a clean break without any extra glass shards or slivers; but the liquid or solution may be filtered for greater assurance.

In certain circumstances it may be helpful to store two separate substances in a single storage unit, and ampoules cannot be used for this purpose. For example, this may be the case for certain medicaments which need mixing prior to their use. As another example, certain adhesives (such as epoxy resins) may need to be mixed before they can be applied. For some substances, it is preferable to avoid mixing of the two substances until shortly prior to their use. Previous storage units may include separate first and second volumes, each of which can receive its own respective substance.

US 2005/0016875 A1 discloses a container for containing two different separate products and mixing them. The container includes a recipient intended for containing a first product, and a capsule intended for containing a second product. The capsule is tightly arranged inside of a neck of the recipient. The bottom part of the capsule may be broken by exerting pressure from a cutting edge of the cap. This may then enable the contents of the capsule to mix with the contents of the recipient.

SUMMARY

Aspects of the invention are as set out in the independent claims and optional features are set out in the dependent claims. Aspects of the invention may be provided in conjunction with each other and features of one aspect may be applied to other aspects.

In an aspect, there is provided a method of packaging a two component composition, comprising a first component and a second component, into a dual vial. The dual vial comprises a first vial and a second vial, wherein the first vial is nested within the second vial. The method comprises: providing the first component of the composition into the first vial; providing the second component of the composition into a volume, of the second vial, surrounding the first vial; and (iii) closing the first vial and the second vial. The first vial may therefore be situated in the second vial when the second component of the composition is put into the second volume.

Closing the second vial may comprise heat sealing an opening of the second vial to provide a hermetic ampoule containing the second component and at least part of the first vial. Heat sealing may include heating using a flame, such as a gas flame. Heat sealing may include heating using a laser.

Closing the first vial may comprise covering, for example sealing, a mouth of the first vial.

The dual vial may comprise a single continuous piece of material arranged to provide both the first vial and the second vial, for example the two vials may be integrated together. For example they may be integrally formed from the same single piece of material.

The first vial may comprise a break zone which is weaker than the surrounding parts of the dual vial. The break zone may be provided in a wall of the first vial and may be weaker than the rest (i.e. the surrounding parts) of the wall of the first vial. The break zone may circumscribe a region of the first vial. For example, it may be arranged in a closed path on the wall of the first vial, such as a band around the circumference of the first vial. The break zone may provide the join between the first vial and the second vial.

In an aspect, there is provided a dual vial comprising a first vial and a second vial. The first vial is nested inside the second vial. The first vial is coupled to the second vial via a selected break zone. The break zone is configured to separate the first vial from the second vial at the break zone in response to a force above a selected threshold being applied to the first vial.

In an aspect, there is provided a dual vial comprising a first vial and a second vial. The first vial is nested inside the second vial, wherein the dual vial is arranged so that the first vial seals the second vial.

In an aspect, there is provided a dual vial comprising a first vial and a second vial. The first vial is nested inside the second vial. The dual vial comprises a breakable seal separating the contents of the first vial from the contents of the second vial. A portion of a wall of the first vial may provide this breakable seal.

The first vial may be nested within the second vial; it may not. For example, the first vial and the second vial may share a common wall which separates the two portions. A portion of the first vial may be at least partially surrounded by the volume of the second vial. The first vial may be located adjacent to the second vial in a volume inside the dual vial.

In aspects, there may be provided a dual vial comprising a first vial and a second vial. The first vial is coupled to the second vial via a selected break zone, the break zone configured to separate the first vial from the second vial at the break zone in response to a force above a selected threshold being applied to the first vial.

In aspects, there is provided a dual vial comprising a single continuous piece of material comprising a first vial and a second vial, wherein the dual vial is arranged so that the first vial seals the second vial.

In aspects, there is provided a dual vial comprising a single continuous piece of material arranged to provide both a first vial and a second vial. The dual vial comprises a breakable seal separating the contents of the first vial from the contents of the second vial.

In aspects, there is provided a dual vial comprising a single continuous piece of material arranged to provide both a portion of a first vial and a portion of a second vial. The dual vial is arranged so that the first vial seals the second vial.

As above, in any of these dual vials a single continuous piece of material may provide both the first vial and the second vial, for example they may be integrally formed from the same piece of material. The first vial and the second vial may be provided by separate pieces of material which may be joined together, e.g. by a weld.

The break zone may be provided by a region of a wall of the first vial and may be weaker than the rest of that wall.

This break zone may be arranged so that applying force above a selected threshold to the first vial causes the first vial to separate from the second vial at the break zone. The break zone may circumscribe a region of the first vial. For example, it may be arranged in a band around the circumference of the first vial. The break zone may provide the join between the first vial and the second vial.

Aspects of the disclosure may include a medical package comprising a dual vial as disclosed herein.

The first vial may be provided by a first portion of a piece of material and the second vial may be provided by a second portion of that same piece of material. Either or both of the first and second vials (or the single piece of material) may be glass. The dual vial may be formed from a single glass component, such as a glass cylinder.

The first vial sealing the second vial may comprise the first vial (in its non-separated state) obstructing access to the second vial via a mouth of the dual vial. For example, the dual vial may have a mouth which, if the first vial was not in place would form a mouth of the second vial. However, the first vial is located in the second vial and is situated (i.e. connected to the dual vial) so that the second vial does not have access to the mouth. That is, the first vial seals the second vial. In the event that the first vial is separated from the second vial, the mouth may then be used to access the second vial, thus it is no longer 'sealed' by the first vial. The first vial may seal the second vial in that a wall of the first vial may provide a hermetic or impermeable seal between the first vial and the second vial so that particles cannot pass from the first vial into the second vial within the interior volume of the dual vial itself.

The first and second vials may be formed from a single piece of the same material. Forming may comprise heat softening said material. For example, this may include heat softening in combination with mechanical forming and drawing, such as using forming tools, including forming wheels and a forming pin for forming a shoulder, neck, neck bore and head of the dual vial. A base of the dual vial may be flattened with a forming tool; this may provide a perpendicular base for increased stability.

The first vial may be coupled to the second vial via a break zone in a wall of the first vial. For example, where a single piece of material provides for both the first and second vial, the line of weakness is provided in the portion of the single piece of material which provides for the first vial. The break zone may be an area of material which is weaker than its surroundings. It may be a selected/pre-defined area or line which covers the majority of a perimeter of the first vial. The break zone is configured to be a portion of the first vial/dual vial which breaks first when the first vial experiences a sufficient force on it.

The break zone may be selected to be on the first vial proximal to the coupling or transition between the first vial and the second vial. The break zone may be provided at the interface between the first and second vial. The break zone may be provided at a location selected so that a maximum amount of substance is retrievable from the second vial (the volume defined by the second vial). For example, the location of the break zone may be selected so that the length by which remnants from the first vial, after it has been separated from the second vial, protrude into the volume defined by the second vial is reduced. The break zone may be provided at an interface between the first vial and the second vial.

The dual vial may contain a two-component composition. The composition may include a medicament. It is to be appreciated that a medicament may comprise a substance used during a process of medical treatment. For example, this may include drugs used for diagnosing, curing, treating or preventing a medical illness. Examples of medicaments include diagnostic reagents and other suitable chemical combinations. The composition may include an adhesive, such as an industrial adhesive. The composition may include chemicals, for example chemicals which are to be reacted together in some way, but which are to be kept separate before any reaction takes place.

The composition may include any type of material. For example, a powder or tablet like component may be used, and this may be initially stored in the first vial, such that upon separation, it may be mixed with a component in the second vial. The component in the second vial may be a liquid, such that a substance immersed in the liquid may dissolve, be suspended or involve another chemical reaction, such as a liquid in the first vial mixing with a liquid in the second vial. For examples where the composition is a medicament, the mixed compound (after separation of the first vial) may be taken up by a dispenser. For example, this may be taken up using a dispensing interface. The dispenser may then be used to administer the medicament, e.g. via a syringe or spray. In embodiments, at least one of the first component and the second component comprises a lyophilised substance.

Embodiments may enable the provision of more readily transportable medicaments (or other substances), i.e. to less accessible parts of the world, such as delivering medicines to the third world. Embodiments may be less likely to expire or deteriorate in quality before they are ready to be used. The dual vial may contain mixed components for either a single use or multiple uses (e.g. single/multiple doses).

It is to be appreciated that each component of the two-component composition may include suitable first and second components. For example, the first component may be a liquid, a powder, a granulate, a gas or a lyophilised substance. For example, the second component may be a liquid, a powder, a granulate, a gas or a lyophilised substance. In some examples, combinations of first and second substances may include lyophilised substance and liquid, powder and liquid, granulate and liquid, liquid and liquid or gas and liquid.

As set out above, a break zone may be provided which separates the first vial from the second vial. Separation may include the first vial being physically removed or disconnected or dislocated from the second vial. Separation may include breaking the first vial (or a wall of the first vial) at the break zone. The break zone may be selected to be of a sufficient size and or area such that breaking of the first vial at the break zone is sufficient to remove the first vial from the second vial so that the two are no longer connected.

The break zone may comprise weakened portions (e.g. 'defects') and/or methods of the disclosure may comprise forming weakened portions in a break zone of a wall of the first wall to create/provide a break zone. The break zone may be defined as the region comprising the weakened portions. The weakened portions, or 'defects', make the wall in that section weaker. The weakened portions are structurally modified regions of the dual vial, which have been structurally modified to be weaker than their surroundings. In examples, even with the break zone there may be a single continuous piece of material.

Forming weakened portions may comprise applying laser energy to the break zone, such as by applying a laser to the break zone. The laser energy may be applied to cause laser filamentation resulting in material modification within the wall of the first vial. The laser energy may be applied to cause surface ablation to scribe the wall of the first vial. The laser energy may be applied to cause heating and thermal expansion to create internal stress within the wall of the first vial. Laser energy may be applied to the wall of the first vial via a mouth of the first vial. It is to be appreciated that laser energy may be applied to the wall of the first vial via a mouth of the second vial. For example, this may be applied through a neck of the dual vial with a laser beam focusing on an inner wall of the first vial on an opposite side of the dual vial to the laser. Laser energy may be applied to an outside wall of the first vial through an opening in the second vial, such as an opening at the bottom end of the second vial (the opposite end to the end at which the first vial connects to the second vial).

Laser energy may be provided by an ultra-high frequency laser. It is to be appreciated in the context of this disclosure that an ultra-high frequency laser may include a femtosecond or picosecond laser.

The break zone may be configured to separate the first vial from the second vial at the break zone in response to a force above a selected threshold being applied to the first vial. The force at the selected threshold may represent a breaking stress for material in the break zone. The break zone is configured such that the breaking stress in the break zone is selected so that, under stress, the breaking zone breaks first relative to other portions of the first vial. The break zone portion of a wall of the first vial may have a lower breaking stress than its surroundings and/or any of the other portions of wall in the first vial.

The break zone may be formed by at least one of laser etching, for example using micropulse/ultra-high frequency laser, chemical etching, for example using ink and/or acid, and mechanical etching, for example via mechanical scribe. The break zone may be formed based on thermal stress created by heat differentials applied to different zones of the vial during construction, such as during the forming process, when using an annealing lehr, or as a separate process subsequent to the annealing lehr. It is to be appreciated that the annealing lehr could also be used to ensure a consistent strength of the vial. Portions of the material having differing rates of thermal expansion may be used to provide the break zone. For example, ink (e.g. ceramic ink) or flux or paste may be applied to the glass surface which has a different rate of thermal expansion to the glass. Expansion at the different rates may provide micro-cracks in the glass surface which provide stress raisers which initiate the crack and separation of the first vial. The break zone may be of the same thickness to its surroundings; it may be thicker; it may be thinner. The break zone may be formed so that it is weaker than its surroundings without necessarily reducing its thickness. A colour break ring may be used. For example, a colour break ring may include particles, such as ceramic, disposed in a pigment. Particles included in the colour break ring may have a different rate of thermal expansion to the material of the vial. The colour break ring may be applied to the vial before being dried and/or heated so that the difference in thermal expansion causes cracks (e.g. microcracks) in the vial.

An engagement means may be provided for coupling the dual vial with a dispenser interface. For example, this may be for e.g. coupling to a mouth of the dual vial and/or of the second vial.

The dispenser interface provides a mechanism by which the contents of the dual vial can be dispensed. It is to be appreciated in the context of this disclosure that the dispenser interface may comprise any suitable means for dispensing substances, such as at least one of: a syringe connection, a rigid tube, a squeezable tube, a pump system, a dropper nozzle or a capillary filter tip.

The first vial may be frangibly separated from the second vial. In this context, frangibly means that a portion of the first vial may snap or break so that a portion of the first vial may separate or disconnect from the second vial. Where the first and second vial are both provided by a single continuous piece of material, the frangible separation includes the material being separated into more than one piece. The separation will occur at or proximal to the break zone.

A breaking mechanism may frangibly separate the first vial from the second vial by applying a longitudinal force to the first vial. For example, a longitudinal force may be applied in relation to an embodiment in which at least one of the vials is cylindrical. The breaking mechanism may comprise a protrusion for extending through the mouth to apply force to the first vial to separate the first vial from the second vial. In embodiments, the dual vial may comprise a seal which seals the first vial, such as a rubber stopper seal. The seal may be configured to still provide the protrusion with access to the inside of the first vial.

A wall of the first vial may be configured to provide a seal for sealing the second vial. This wall may include a break zone. The wall may provide a breakable seal between the first and second vial. For example, this may be so that the seal may be broken to enable contents in the first vial to mix with contents in the second vial. For example, the wall of the first vial (i.e. which forms part of the seal) comprises the break zone of the dual vial.

In an aspect, there is provided a dual vial integrally formed of a single continuous piece of glass. The single piece of glass provides a first vial nested inside of a second vial. The first vial is circular in cross-section, has a closed end and an open mouth and is co-axial with the second vial. The first vial is provided by the single piece of glass extending from the closed end of the first vial within the second vial to the mouth. The single piece of glass also provides a wall of the second vial extending from the circumference of the mouth outside the first vial to surround the first vial. For example, this may extend around the entire circumference. A line of weakness extends circumferentially around a portion of the first vial to provide a selected break zone at which the first vial can be broken to separate the first vial from the second vial at the break zone in response to a force above a selected threshold being applied to the first vial.

FIGURES

Some embodiments will now be described, by way of example only, with reference to the figures, in which.

In the drawings like reference numerals are used to indicate like elements.

SPECIFIC DESCRIPTION

Figure 1:
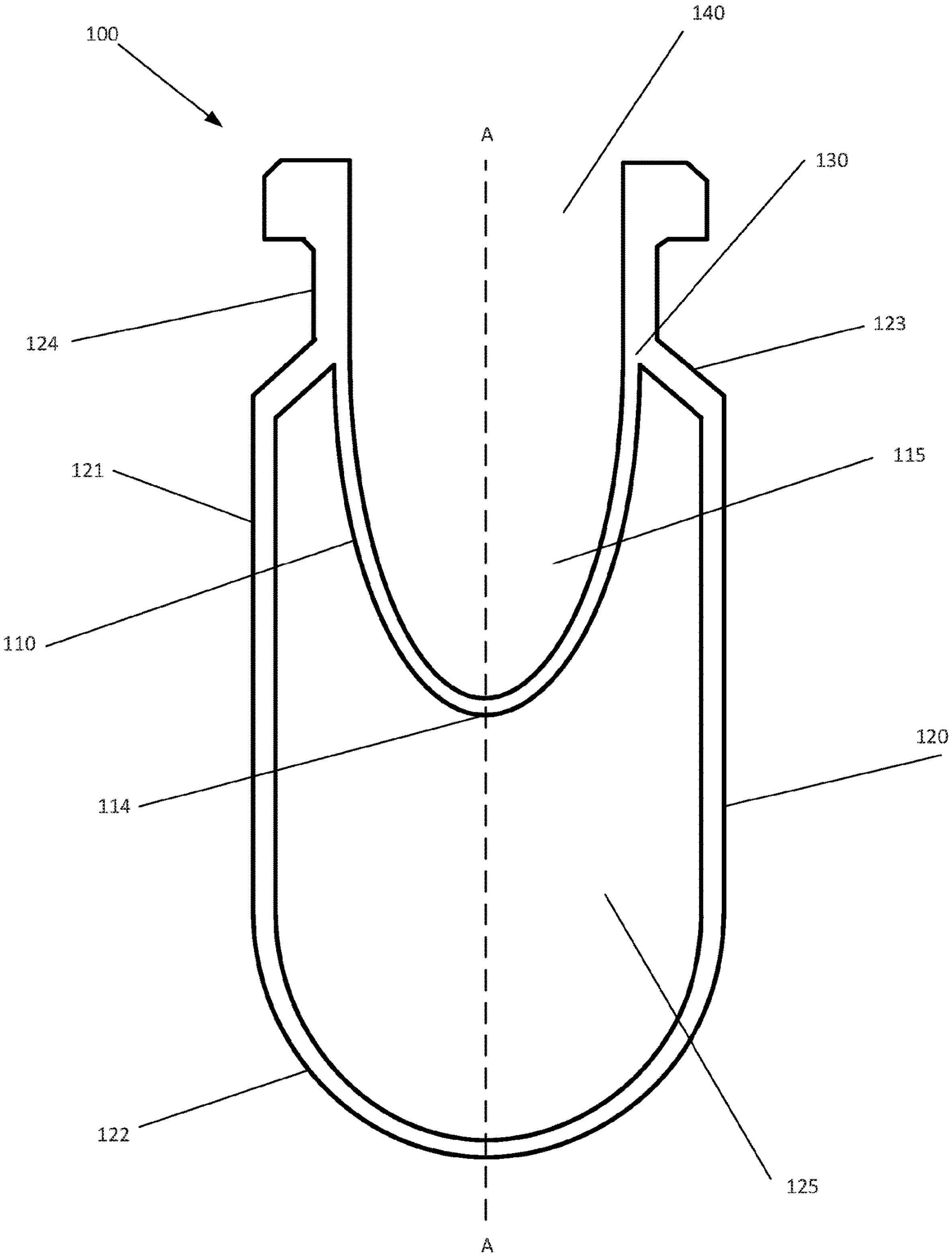
FIG. 1 is a schematic diagram of a dual vial in which the first vial is connected to the second vial.

FIG. 1 shows a dual vial 100 comprising a first vial 110 and a second vial 120 both of which may be integrally formed of a single continuous piece of material. This single continuous piece of material provides the walls and base of the first vial 110 and the walls and base of the second vial 120.

The first vial 110 is nested inside the second vial 120. A transition zone 130 is illustrated in FIG. 1 as the region of the single piece of material which joins the first vial 110 to the second vial 120. The transition zone 130 forms a coupling point or join between the first vial 110 and the second vial 120.

Figure 2:
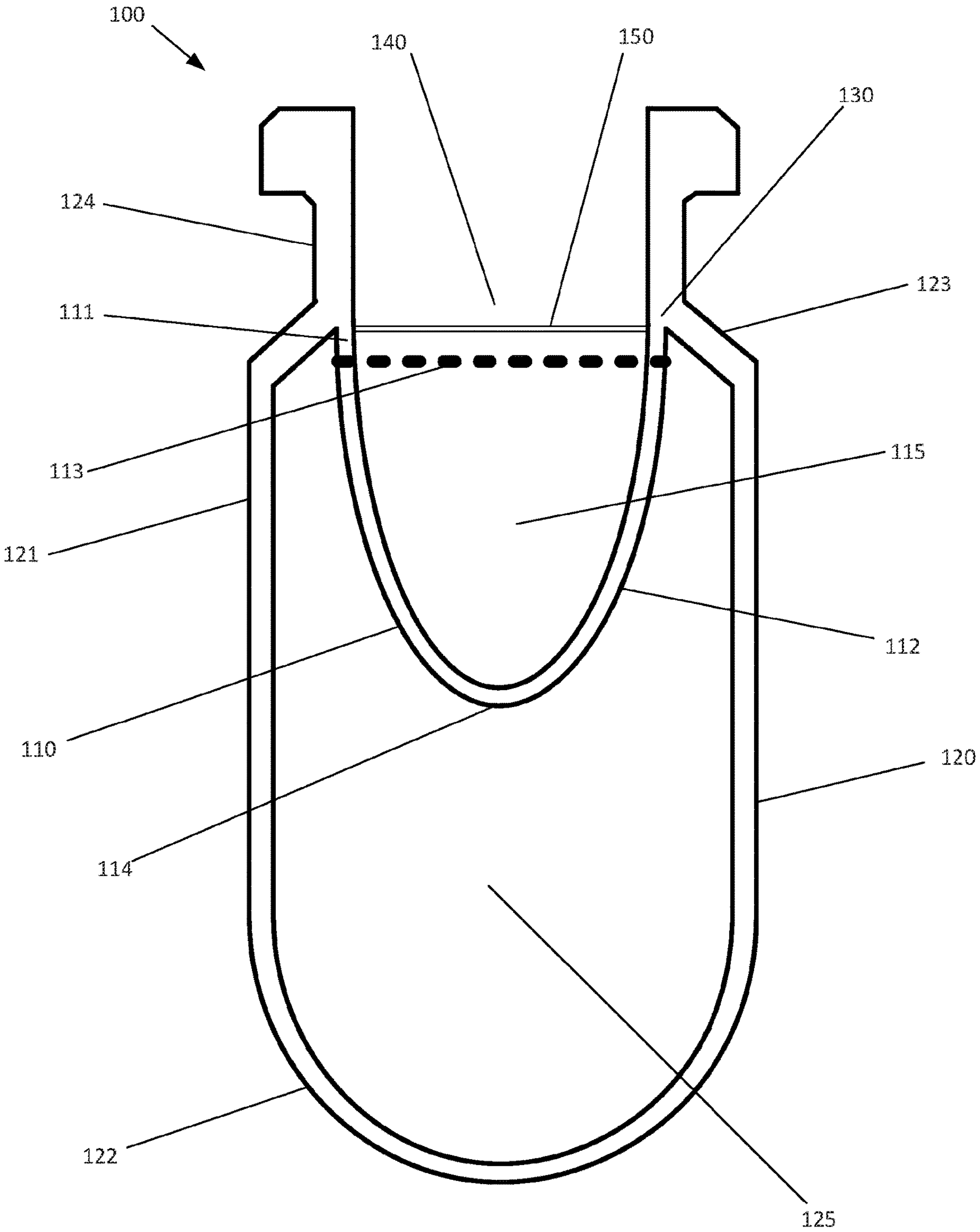
FIG. 2 is a schematic diagram of the dual vial of FIG. 1 with additional features included.

The first vial 110 has a closed end 114 and an open end. The open end may provide a mouth 140 for the first vial through which a substance can be provided into the internal volume 115 of the first vial 110 for storage. The first vial 110 may be closed (as illustrated in FIG. 2) by covering or otherwise occluding the mouth 140 to completely enclose its internal volume, for example it may be sealed if necessary. A longitudinal axis A-A is illustrated in FIG. 1 which extends from the mouth 140 through the closed end 114 of the first vial 110.

The first vial 110 is substantially cylindrical in that it is circular in cross-section, although it may have a rounded taper (e.g. be a bullet shape) as illustrated in FIG. 1. For example, from the closed end 114 of the first vial, the diameter of the first vial 110 may increase. The first vial may be concentric (e.g. co-axial) with the second vial 120.

The part of the single piece of material which provides the first vial 110 may include the closed end 114 and the mouth 140, at which point it meets the transition zone 130. On the other side of the transition zone 130, the single piece of material may continue and provide the second vial 120.

The diameter of the first vial 110 is less than that of the second vial 120 until, at the transition zone 130, the two vials 110, 120 meet.

The second vial 120 may have the same shape as the first vial 110. The second vial 120 encloses a second volume 125 which surrounds the first vial 110. As illustrated in FIG. 1 the second vial 120 has a lower portion 122, which is further away from the mouth 140 than the closed end 114 of the first vial 110. A body 121 of the second vial is connected by a shoulder 123 to the transition zone 130.

The second vial may also include a neck 124 connected to the body 121 by the shoulder 123. The neck 124 and/or the shoulder 123 of the second vial 120 may surround the mouth 140 of the first vial 110. In the example illustrated in FIG. 1, the second vial 120 is substantially cylindrical in that it is circular in cross section (in the plane perpendicular to the longitudinal axis). The mouth 140 and the body 121 of the second vial 120 are largely cylindrical in shape. The shoulder 123 tapers in from the body 121 to the neck 124, and the lower portion 122 may also taper in to a closed end of the second vial 120. For example, the shoulder 123 may taper outward (increase in diameter) from the region of the neck 124 and transition zone 130 to the body 121. The lower portion 122 may taper inward (decrease in diameter) from the body 121 to a heat seal or closure of the second vial 120. As mentioned above, the taper of the lower portion may be rounded or bullet shaped.

At the transition zone 130, the portion of the single piece of material providing the first vial 110 is connected to the portion providing the second vial 120 around the entire circumference of the join between the mouth 140 of the first vial 110 and the shoulder 123 and/or neck 124 of the second vial. The wall of the first vial 110 is continuous (has no holes, breaks or cracks in) for the entirety of the first vial 110. In this context, the first vial 110 seals the second vial 120 as the piece of material providing the first vial 110 completely obstructs a path from the mouth 140 to the second volume 125. The first vial 110 may provide a seal for the second vial 120. The second vial 120 may provide an ampoule sealed by the first vial 110 and the lower portion 122 of the second vial 120. As the first vial 110 and the second vial 120 are connected at the transition zone 130, which encloses the mouth 140, the two vials may be thought of as sharing the mouth 140, i.e. they have a common mouth.

When viewed along the longitudinal axis A-A (as in FIG. 1), the first vial 110 may be tapered so that it is generally bullet-shaped, i.e. it has a rounded end. The second vial 120 may also be tapered so that it is generally bullet-shaped. The single continuous piece of material providing the first vial 110 and the second vial 120 is glass.

Figure 11:
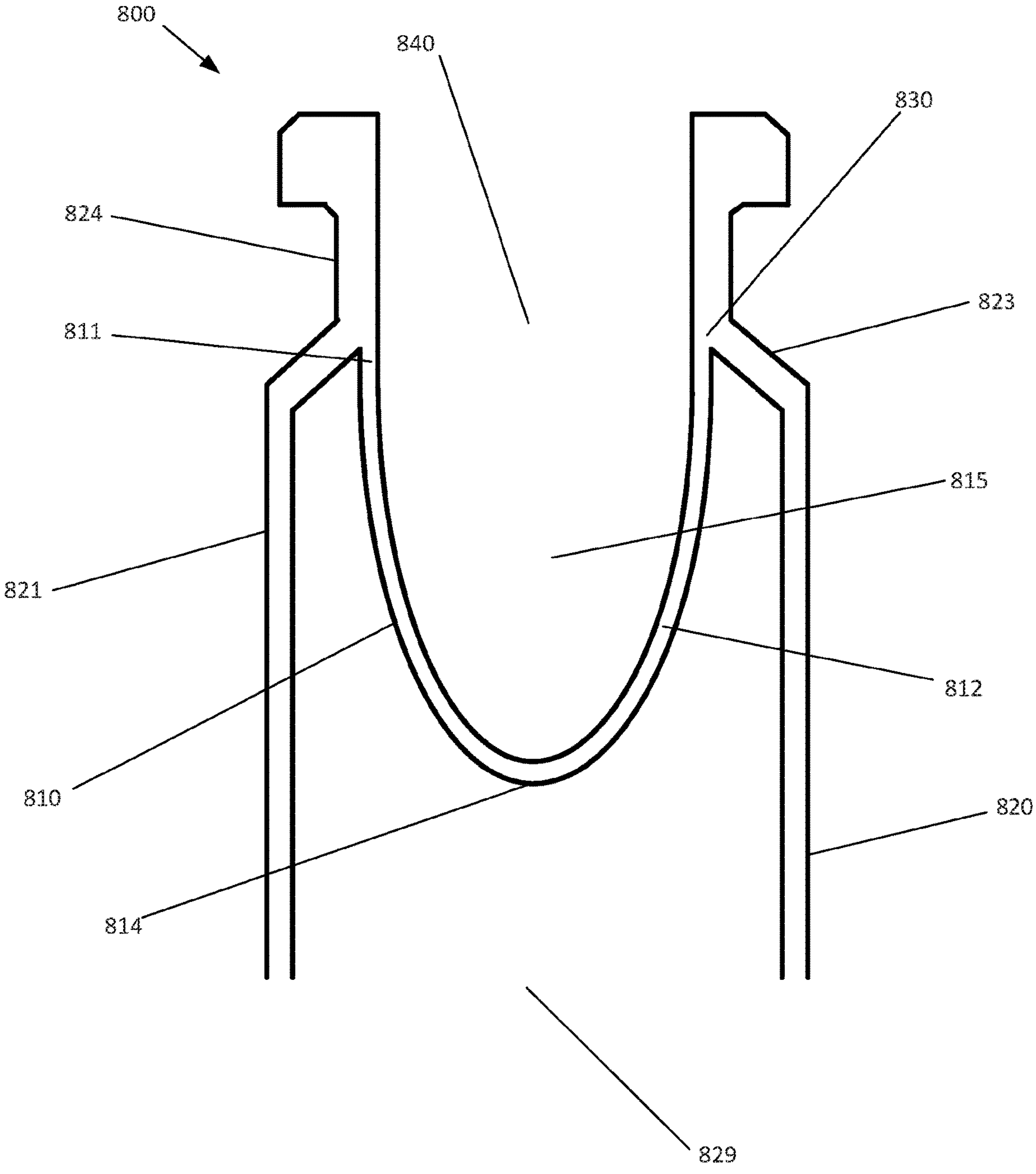
FIG. 11 is a schematic diagram of a dual vial in which the first vial is connected to the second vial.

Manufacture of the dual vial described above will now be described with reference to FIG. 11. To manufacture a dual vial as described above, a length may be cut from a glass cylinder, e.g. using a heat cutter (such as a gas torch or laser) to provide a glass blank. Typically the cut end of this glass blank may be closed by the cutting process—e.g. one end of the cylinder may be closed by a flat surface of hot, soft, glass. Whilst still hot and soft, this flat closed end may then be deformed inwardly, into the interior of the glass blank, by a moulding tool. This may provide a glass cylinder with a concave glass bowl inside one end—this glass bowl may provide a first vial 810 of a dual vial (e.g. as described above). Whilst this end, and the first vial 810, are still hot and soft (or after additional heating) the neck 824 and shoulders 823 of the dual vial described above can be formed by pushing (e.g. by rolling) this hot end of the glass cylinder against an appropriate moulding tool. The neck may also be formed with either a thread or crimp fit (e.g. on its outer surface) at this stage. The resultant structure is a vial blank which comprises the neck 824 and shoulders 823 of a dual vial (e.g. as described above with reference to FIG. 1), and the first vial 810. Joined to the neck 824 and shoulders 823, and surrounding the first vial 810, is the rest of the glass cylinder which will provide the body 820 and optionally a lower portion of the second vial 820. This cylinder may be open at the other end (to provide an open end 829) at this stage, as illustrated in FIG. 11.

The break zone may be created at this stage. This may be done by providing laser energy (e.g. from a femtosecond laser) onto a region of the wall of the first vial 810. The laser may be sufficiently energetic to cause weakening of the glass. The laser beam may be scanned across the surface of the wall (e.g. in a circular or closed path) to provide a break zone that, when broken, will cause all or part of the first vial 810 to detach from the neck 824 and shoulders 823 of the dual vial 800. For example, the laser may be scanned around the circumference of the first vial 810 to create a circumferential break zone that is weaker than the rest of the wall of the first vial.

To package a two component composition into this dual vial 800, it can be inverted so that the neck 824 and shoulders 823 point downward, and the open end 829 of the glass cylinder points upward. A component of this two component composition can then be introduced into the cylinder. The open end 829 of the glass cylinder can then be heat sealed, e.g. in the manner of an ampoule. For example a gas torch or laser may be used to heat seal the glass cylinder to provide the lower end of the second vial. The dual vial can then be inverted and the other component of the two component composition can be introduced into the first vial 810 (e.g. through the mouth of the neck). The first vial 810 can then be closed—e.g. by crimping or threading an appropriate cap onto the neck.

Of course, the first vial 810 may be filled and closed first, before the second vial 820 is filled and heat sealed. The sequence of these two operations may be significant in some circumstances.

With regard to FIG. 2, there is illustrated the dual vial 100 of FIG. 1 with a break zone 113 and a seal 150 included. The seal 150 encloses the first volume 115 so that it is completely enclosed. The seal 150 may be in the region of the transition zone 130 inside the neck 124 of the second vial 120 so that the neck 124 extends above the seal 150.

The break zone 113 may be a line of weakness extending circumferentially around the first vial 110. As shown in FIG. 2, the break zone 113 may extend around the entire circumference of the first vial 110. With reference to the break zone 113, a fixed portion 111 and a separable portion 112 of the first vial 110 can be defined. The fixed portion 111 is located between the break zone 113 and the transition zone 130. The separable portion 112 is located on the other side of the break zone 113 to the fixed portion 111, i.e. it is closer to the lower portion 122 of the second vial 120. The break zone 113 is proximal to the transition zone 130. The distance that the fixed portion 111 protrudes into the second vial 120 may be selected to be as short as possible. This distance may be selected based on the configuration and contents of the dual vial 100.

The break zone 113 may be configured so that the first vial 110 may snap at the break zone 113 leaving the fixed portion 111 of the first vial 110 attached to the second vial 120, and the separable portion 112 of the first vial 110 disconnected from the second vial 120. The break zone 113 will break in response to a force greater than a selected threshold being applied to the first vial 110. The break zone 113 is configured to be weaker than the rest of the first vial 110 so that in response to said force being applied to the first vial 110, the portion of the first vial 110 which breaks will be the break zone 113. The mouth 140 is configured to receive a protrusion which extends through the mouth 140 to apply force to the first vial 110, and the first vial 110 is configured, i.e. shaped, to receive the protrusion. This may include an apex at the closed end 114 of the first vial 110.

In operation, a protrusion may extend through the mouth 140 and apply a force to the first vial 110. The force applied may be applied along the longitudinal axis in the direction of the lower portion 122 of the second vial 120, and/or it may be applied radially outwards from the longitudinal axis. Although not shown in the Figs., a cap may be provided which includes a breaking mechanism, which comprises the protrusion. In response to the applied force being greater than a selected threshold, the pressure building up in the first vial 110 is greater than that which the break zone 113 can withstand. Consequently, the break zone 113 buckles and snaps, which separates the majority of the first vial 110, i.e. the separable portion 112, from the second vial 120. The dual vial 100 is therefore no longer one continuous piece of material.

Figure 3:
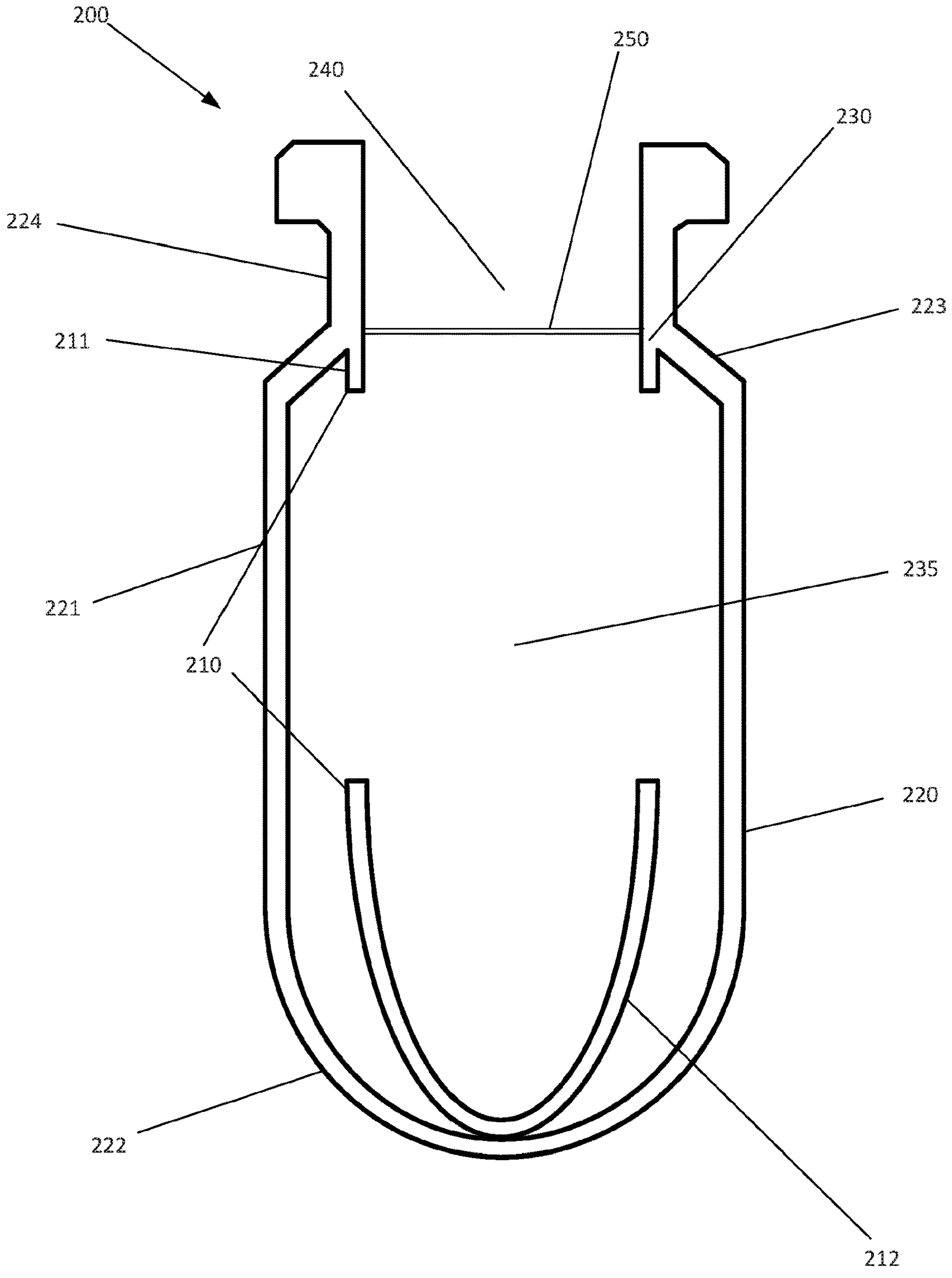
FIG. 3 is a schematic diagram of a dual vial in which the first vial has been separated from the second vial.

FIG. 3 shows a dual vial 200, which corresponds to the dual vial 100 of FIG. 2 after the first vial 110 of FIG. 1 has been separated from the second vial 120 of FIG. 1. Like reference numerals have been used in FIGS. 3 and 4 to correspond to the same features as described with regards to FIGS. 1 and 2. These features will not be described again.

As shown in FIG. 3, the separable portion 212 of the first vial 210 has been separated from the fixed portion 211. A shared volume 235 may now be defined which encompasses both the first volume 115 and the second volume 125 as the wall separating the two has been removed. The fixed portion 211 may be the only portion of the first vial 210 which remains attached to the second vial 220. The fixed portion 211 stands proud into the shared volume 235. The fixed portion 211 is circular in cross-section although it is to be appreciated that the break may not be clean and so the separable portion 212 may be in several pieces.

The dual vial 100 may be used to contain two substances in separated volumes so that they are only mixed together shortly prior to use. The first volume 115 may contain a first substance, and the second volume 125 may contain a second substance. The two substances may then be mixed in the shared volume 235 after the break zone 113 has been broken to separate the separable portion 212 of the first vial 210 from the fixed portion 211. Although not shown in FIGS. 1 to 3, the dual vial may comprise engagement means for coupling with a dispenser interface arranged to dispense the mixed substance from the shared volume 235 to a desired location.

Figure 4:
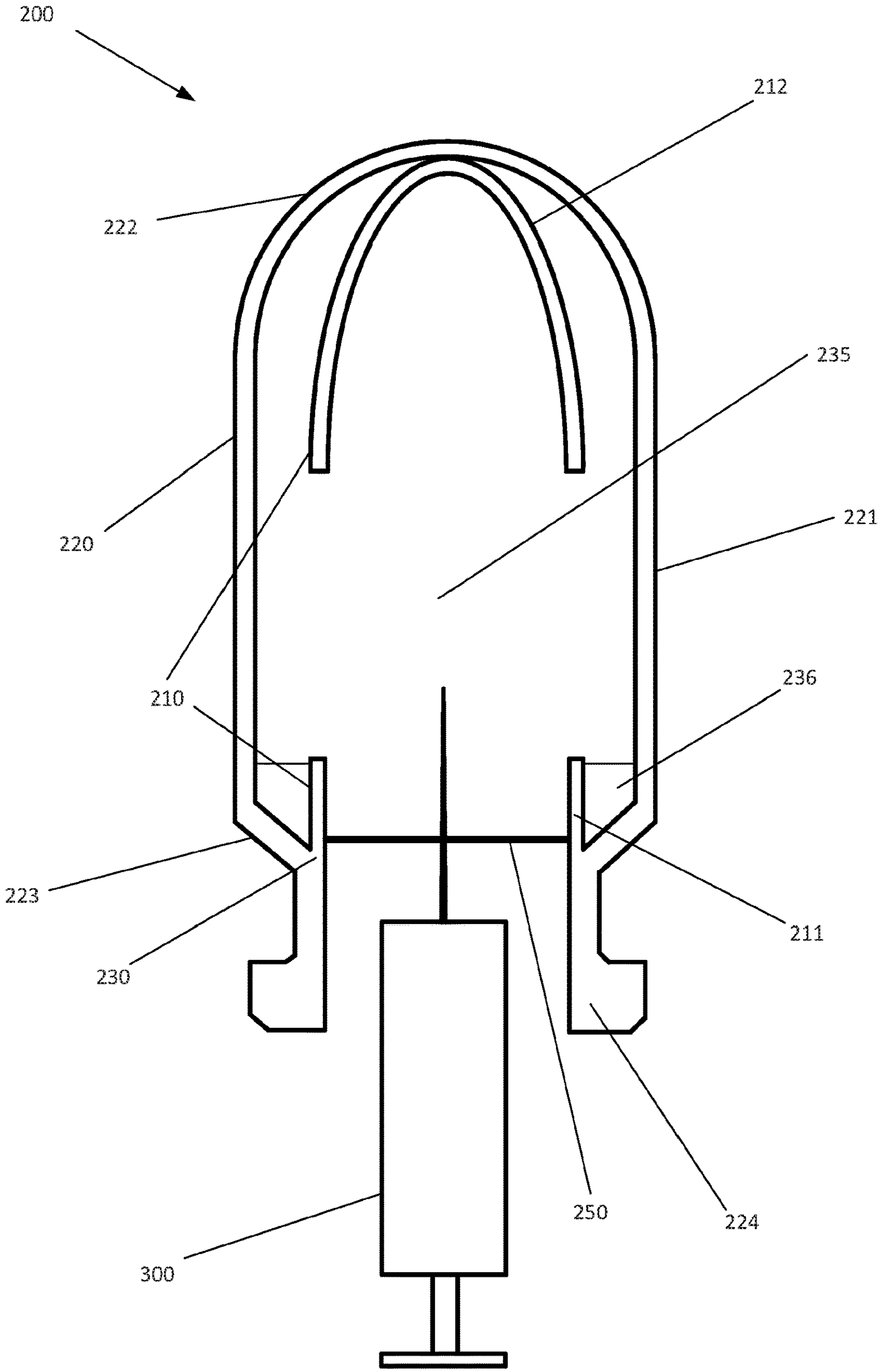
FIG. 4 is a schematic diagram of the dual vial of FIG. 3 being used to dispense a substance.

FIG. 4 illustrates the separated dual vial 200 of FIG. 3. In FIG. 3, the dual vial 200 is inverted and has a syringe 300 inserted into the shared volume 235 for extracting the mixed substance. As shown, the syringe 300 may simply pierce through the seal 250 to extract the mixed substance. FIG. 4 illustrates a trapped region 236 in the shared volume 235. When held in an inverted position (i.e. with the mouth 240 pointing downwards), the fixed portion 211 of the first vial 210 stands proud and forms a levee surrounding the mouth 240 and trapping some substance behind it, which cannot be easily accessed from the mouth 240. To minimise this trapped volume 236, the break zone 113 is arranged as close to the transition zone 130 as possible.

Figure 5:
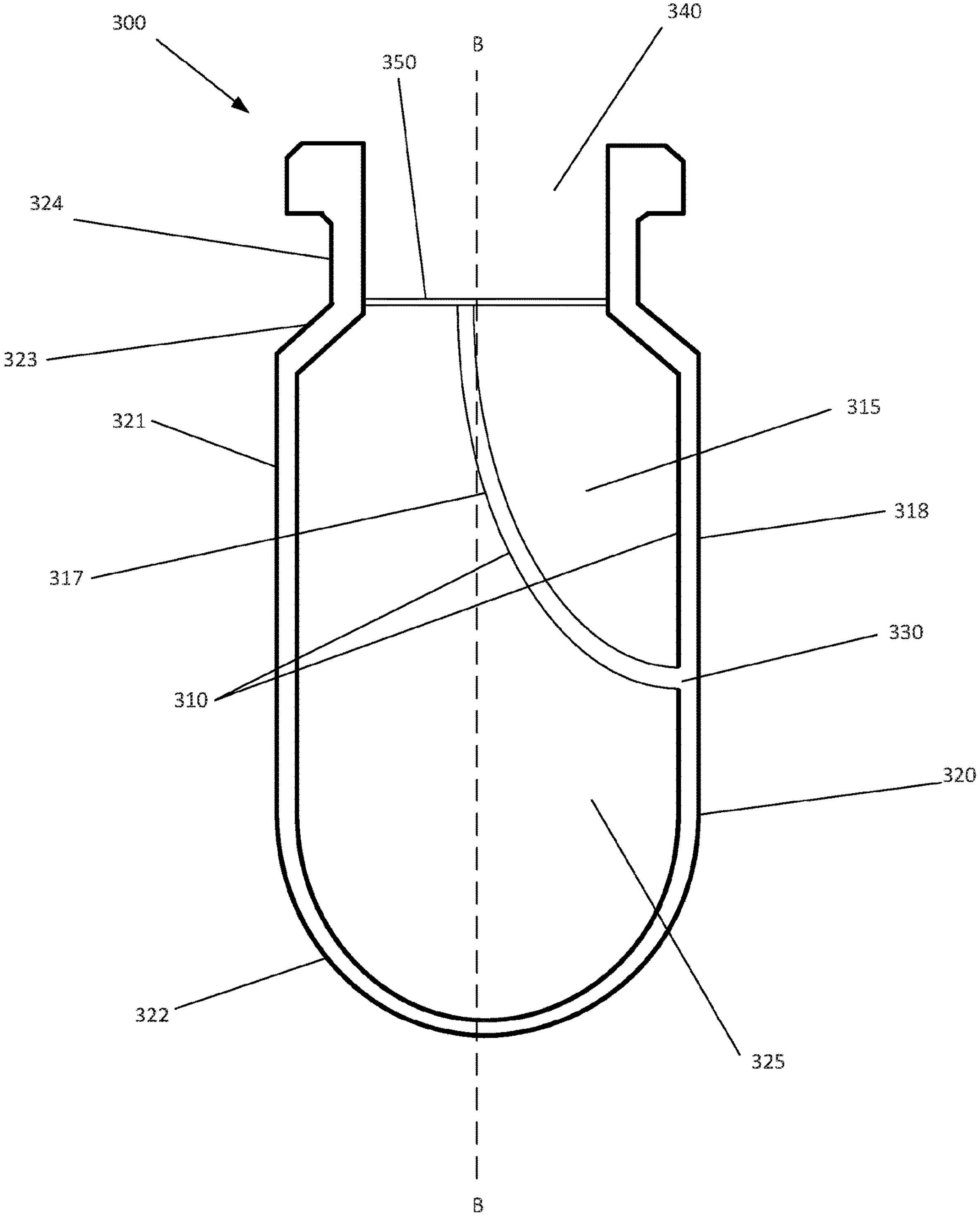
FIG. 5 is a schematic diagram of a dual vial in which both the first and second volumes are accessible through the same mouth.

FIG. 5 shows a dual vial 300 comprising a first vial 310 and a second vial 120, which are connected at a transition zone 330. A portion 318 of the main body 321 of the second vial 320 forms a wall of the first vial 310. A wall 317 of the first vial extends from the transition zone 330 into the inner volume of the dual vial 300 and extends up towards the neck 324. The first vial 310 is arranged to obstruct access to a portion of the mouth 340 from the second volume 325, but not access to the entire mouth 340. The first vial has a closed end and an open end at the mouth 340. The second vial has a closed and an open end at the mouth 340. The mouth 340 provides an opening through which both the first vial 310 and the second vial 320 may be filled. The first vial 310 does not seal the second vial 320. Each vial may be accessed via a different portion of the mouth 340. The first vial 310 may be formed from the same single continuous piece of material that forms the second vial 320.

Figure 6:
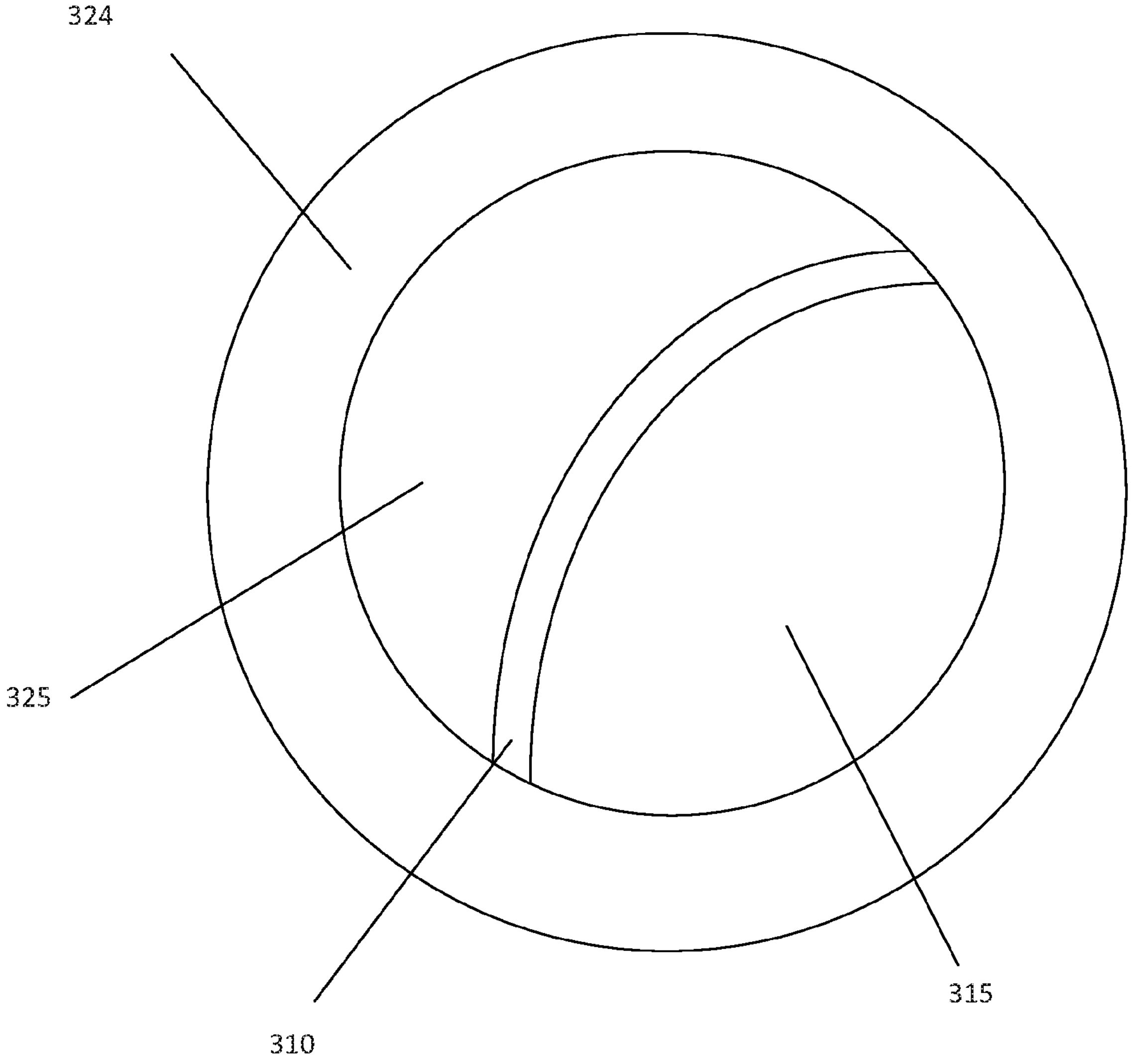
FIG. 6 is a schematic diagram of a cross-section of the vial of FIG. 5 taken in the plane perpendicular to longitudinal axis B-B at a level just beneath the seal.

FIG. 6 shows a cross section of the dual vial 300 of FIG. 5. The cross-section is taken perpendicular to the longitudinal axis B-B illustrated in FIG. 5. The cross-section is taken looking downwards from the underside of seal 350 in FIG. 5. The wall 317 of the first vial 310 which protrudes into the middle of the dual vial 300 is shown to have an arc shape when viewed in cross-section (i.e. from above). It is to be appreciated that any suitable cross-sectional shape could be used, and that this arc is for exemplary purposes only. As can be seen, when looking down into the dual vial, both volumes 315, 325 are accessible through mouth 340, the two being separated by the wall 317 of the first vial 310. Both volumes may be filled through the mouth 340. Additionally, if desired, a component could be extracted from either volume before separation of the first vial 310 from the second vial 320. In some examples, this may therefore be before the components have been mixed together, whilst in other examples, the break zone may break to an extent such that the two components may mix without the first vial separating from the second vial. No break zone is illustrated in either of FIG. 5 or 6, although it is to be appreciated that a break zone could be included at any suitable location on the wall 317 of the first vial 310. The dual vial 300 is therefore comparable to the dual vials described with regard to FIGS. 1 to 4 except the first vial 310 does not seal the second vial 320.

Figure 7:
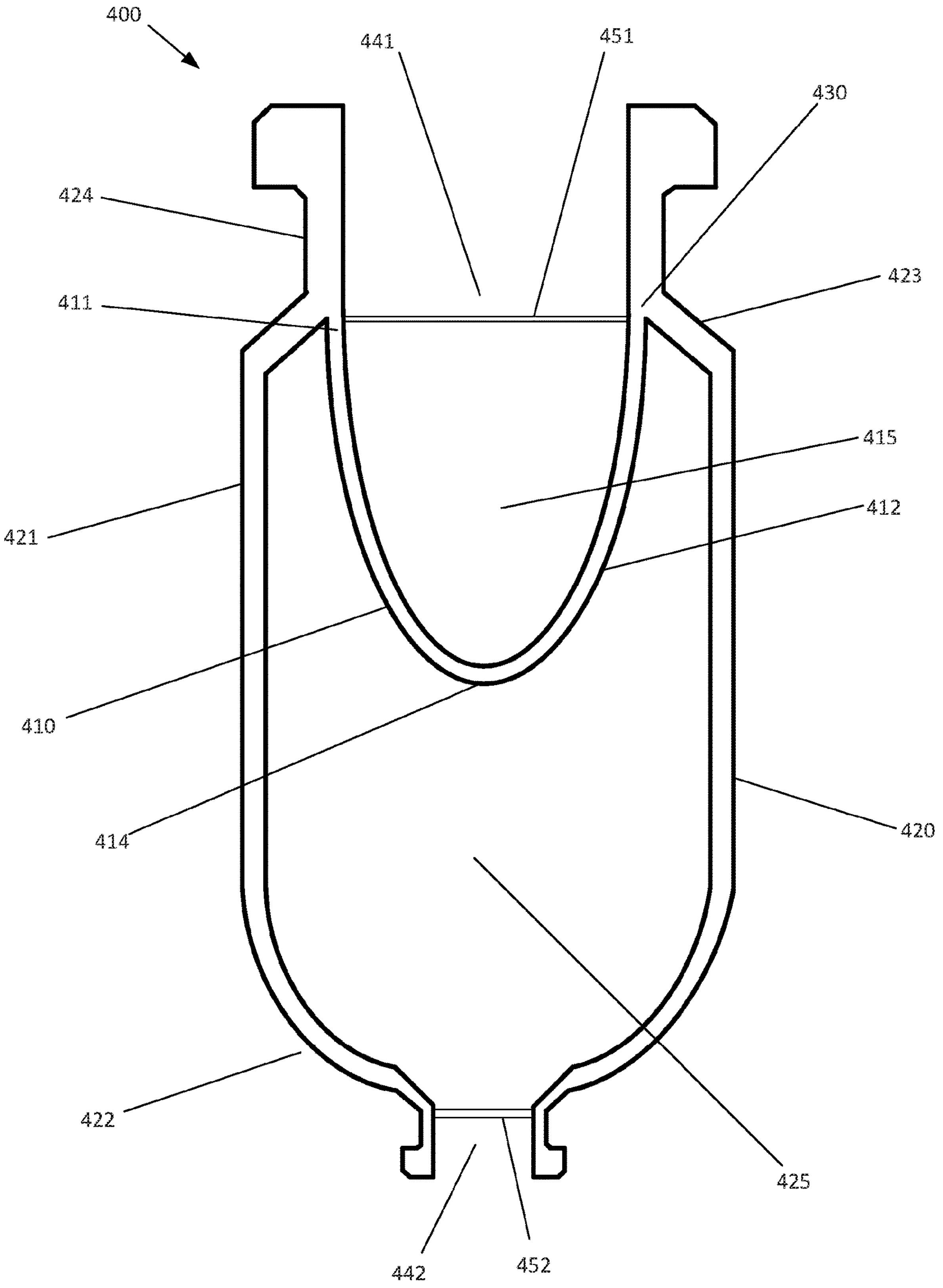
FIG. 7 is a schematic diagram of a dual vial in which each of the first and second vials may be accessed by its own respective mouth.

FIG. 7 shows a dual vial 400 comprising a first vial 410 and a second vial 420. The dual vial 400 has a first mouth 441 for the first vial 410. The dual vial 400 has a second mouth 442 for the second vial 442. Each vial has its own respective mouth so that components may be added to, or removed from, the first volume 415 and the second volume 425 through a respective mouth 441, 442. Each mouth is illustrated as being sealed by a respective seal 451, 452. The second mouth 442 is illustrated as being at an opposite end of the dual vial 400 to the first mouth 441. However, it is to be appreciated that the exact location of either mouth is not considered to be limiting, and that it may vary depending on components contained in the dual vial 400 or manufacturing constraints. The first vial 410 does not seal the second vial 420. The two vials may both be formed from the same single continuous piece of material. Additionally, if desired, a component could be extracted from either volume before separation of the first vial 410 from the second vial 420, i.e. before components have been mixed together. The dual vial 400 is therefore comparable to the dual vials described with regard to FIGS. 1 to 4 except the first vial 410 does not seal the second vial 420 (unless the other end is already sealed).

Figure 8:
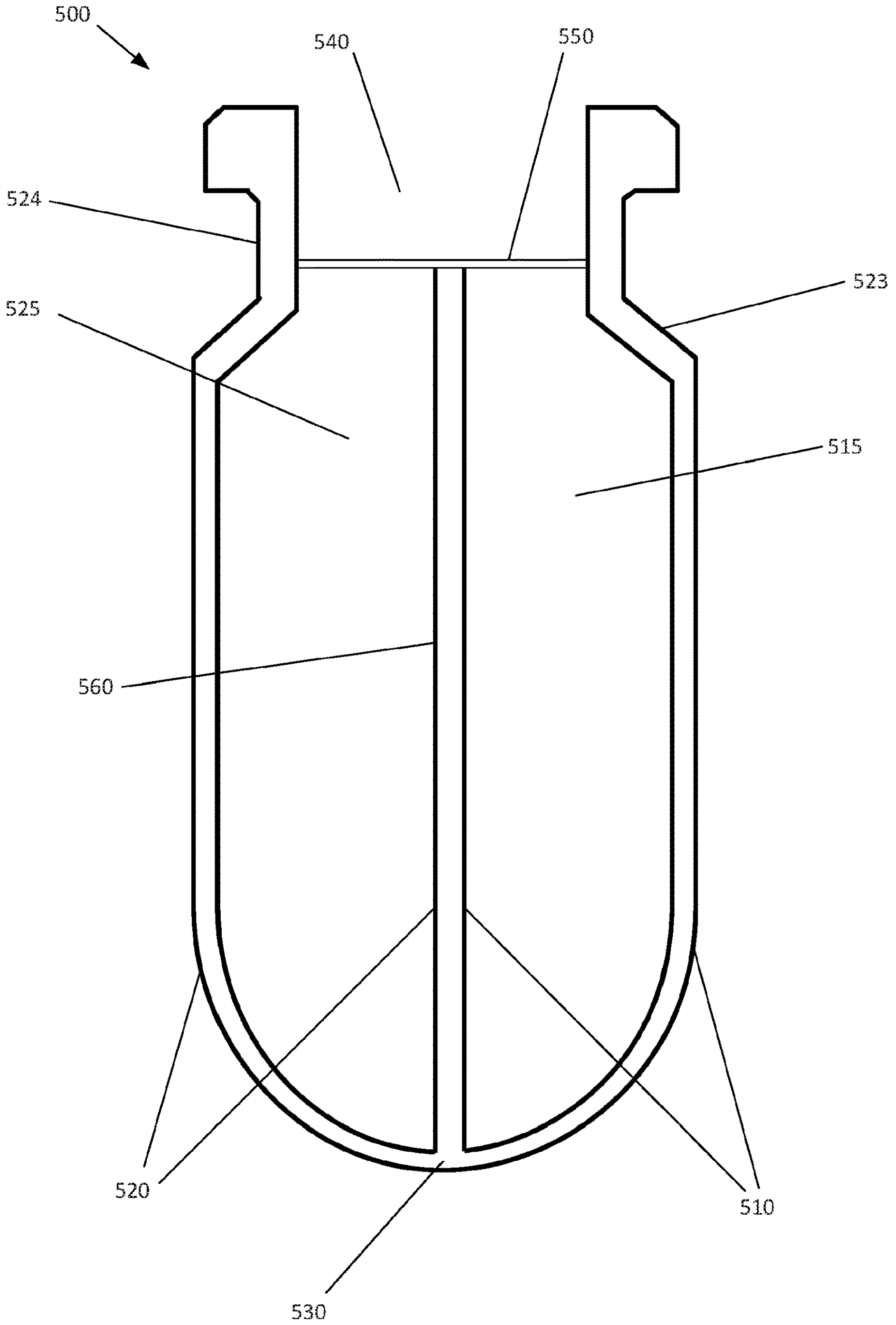
FIG. 8 is a schematic diagram of a dual vial in which the first vial is not nested within the second vial.

FIG. 8 shows a dual vial 500 comprising a first vial 510 and a second vial 520. The interior volume of the dual vial 500 is split into two. The volume is split longitudinally by a wall 560 extending longitudinally upwards from a transition zone 530 at the base of the dual vial 500 to a common mouth 540. The wall 560 forms part of both the first vial 510 and the second vial 520. The first vial 510 does not seal the second vial 520. The wall 560 may be any suitable shape when viewed in cross-section. For example, the shape of the wall 560 may be selected so that the two respective sides of the wall have a desired volume with regard to the volume of substance they are intended to contain. The dual vial 500 is therefore comparable to some of the dual vials previously described herein except the first vial 510 is not nested in the second vial 520.

Figure 9:
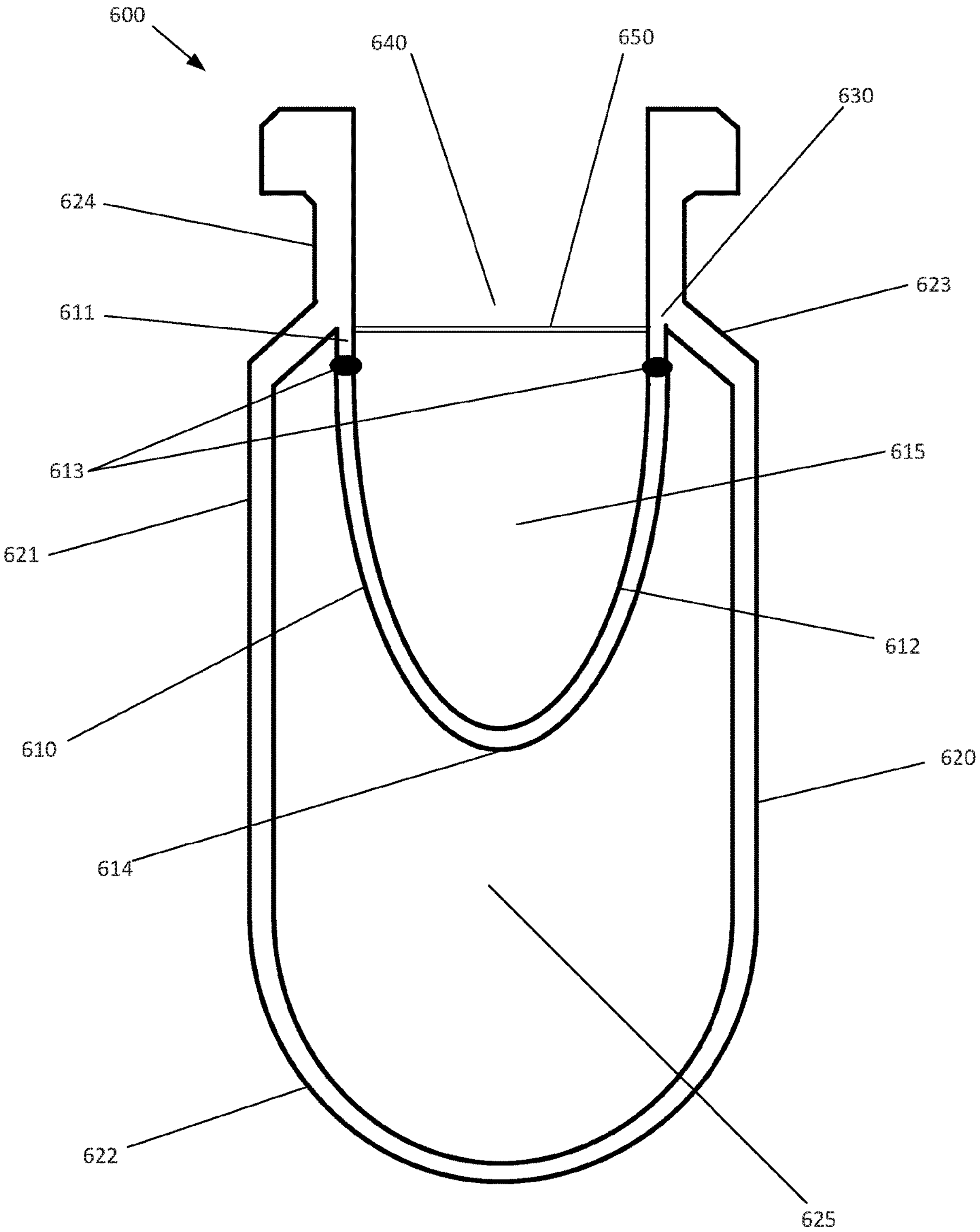
FIG. 9 is a schematic diagram of a dual vial in which the first vial is connected to the second vial.

FIG. 9 shows a dual vial 600 comprising a first vial 610 and a second vial 620. The first vial 610 is nested within the second vial 620. A break zone 613 is illustrated in the form of an additive being present. For example, the additive may be a glass weld which adheres two separate portions of glass together. The first portion of material is a single continuous piece of material providing the second vial 620 and a fixed portion 611 of the first vial 610. A second portion of material may then provide the separable portion 612 of the first vial 610. The dual vial 600 is therefore comparable to the dual vials described with regard to FIGS. 1 to 4 except the dual vial is not provided by a single continuous piece of material. The break zone 613 may be a separate portion added to the dual vial and/or the separable portion 611 of the first vial 610 may be provided by a separate piece of material.

Figure 10:
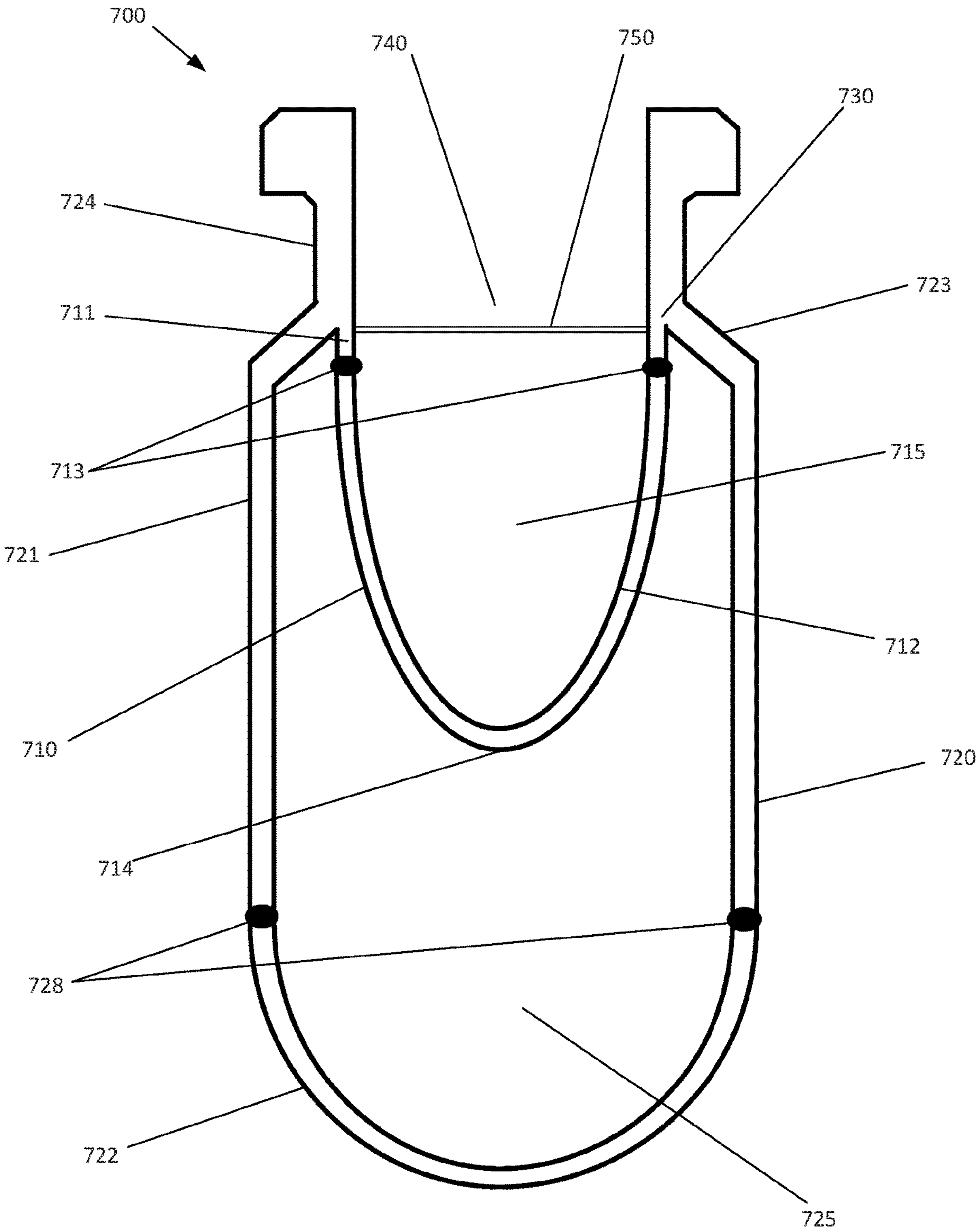
FIG. 10 is a schematic diagram of a dual vial in which the first vial is connected to the second vial.

FIG. 10 shows a dual vial 700 comprising a first vial 710 and a second vial 720. The dual vial 700 is similar to the dual vial 600 shown in FIG. 9 except that the second vial 720 includes an attachment portion 728 by which the bottom portion 722 may be attached to and/or removed from the body 721 of the second vial 720. The dual vial 700 does not comprise a single continuous piece of material arranged to provide both a first vial and a second vial. It may comprise a single piece of material arranged to provide both a portion of the first vial and a portion of the second vial, for example the portion of the dual vial between the attachment portion 728 and the break zone 713. For example a single piece of material may provide both the body 721 of the second vial 720 and the fixed portion 711 of the first vial 710.

FIG. 11 shows a dual vial 800 comprising a first vial 810 and a second vial 820. The dual vial 800 is similar to those discussed above. However, the dual vial 800 does not have a bottom portion of the second vial, i.e. it has yet to be sealed. The dual vial 800 may be provided in this form from a vial manufacturer to a company who fills the dual vial 800 with their products and then seals it. The dual vial 820 may be sealed, as disclosed herein, in a number of different ways so that the second vial 820 provides an ampoule for storing a substance. Once ready, the first vial 810 may also be sealed (i.e. once a substance has been infilled into the first vial 810). The dual vial 800 may comprise a single continuous piece of material arranged to provide the first vial 810 and the second (unsealed) vial 820.

Although a method of manufacture has been described above, in the context of the present disclosure it will be appreciated that the dual vial 100 may be manufactured in a number of different ways. Where a single piece of glass is used, the glass may be heated to soften the glass. The heat applied may be from a flame, such as a gas flame. The softened glass may then be mechanically formed into the selected shape for the dual vial 100. Mechanical forming may include use of neck forming wheels and/or a neck bore to aid in forming of the neck 124 and shoulder 123 sections of the dual vial. A plunger may also be used to aid the manufacturing process.

It is to be appreciated that the break zone 113 may be formed in a number of different ways, each of which enables the break zone 113 to be weaker and less resistant to stresses than the rest of the wall of the vial. Lasers may be used to provide laser energy to a region of the first vial 110 to provide the break zone. The lasers may weaken the area upon which they are incident. This may be done by causing laser filamentation within the wall of the first vial 110 and/or by causing surface ablation of the first vial 110. It will be appreciated in the context of the present disclosure that laser filamentation is the formation of filamentary damage tracks in glass using laser pulses, but any laser cutting process may be used to weaken the glass of the first vial.

It is to be appreciated that a laser may be applied to provide a path of weakness around the first vial. Laser filamentation may be used to provide a series of filaments (e.g. locations in the glass in which filamentary damage tracks are present in the glass) These filamentary damage tracks may extend in the direction of the thickness of the glass wall of the vial. These locations may lie adjacent each other to define a path around the vial (e.g. circumscribing the neck of the interior vial). For example, these adjacent locations may together provide a break zone (such as a line of weakness) despite there being parts of this line of weakness which have unaltered material as the filamentation need not affect all points along a line around the vial in order to provide a break zone. For laser filamentation, pulsed laser energy is transmitted to the vial. Between subsequent pulses of the laser, there is a relative movement between the laser and the vial so that the pulses of laser energy are applied to different points around the vial, e.g. so as to provide the filamentation at a series of weakened locations along a path around the vial. For example, the vial may be rotated about its longitudinal axis whilst the laser is directed at it. The speed of relative movement (e.g. rotation speed of the vial) and/or the pulse rate (pulse duration and/or number of pulses per second) of the laser may be selected to control the number of filaments and the spacing between them. The laser may use pico/femto second pulses.

Lasers can be directed onto the surface of the first vial 110 either through the mouth 140 or through the open bottom of the second vial 120 before it is closed during manufacture (see above). If a laser is directed through the mouth 140, it will be incident on an inner surface of the first vial 110, and if it is directed from beneath the first vial 110, it will be incident on an outer surface of the first vial 110. Either or both uses of the laser could be used to provide the break zone 113.

In addition, or as an alternative, the break zone 113 may be provided using chemical etching methods. These methods include use of specific types of ink or acid which can be applied to a surface of the first vial 110 to weaken it. Application of chemicals to the surface may cause surface corrosion/erosion or other mechanisms by which the first vial 110 in the region of the break zone 113 is weakened. Another possibility is to use mechanical etching. This may include the use of mechanical scribing, wherein a surface of the first vial 110 is marked by a device which can scrape away material, leaving a weaker region.

The break zone 113 could be formed based on thermal stress created by heat differentials applied to different zones of the vial during construction, such as during the forming process or when using an annealing lehr. It is to be appreciated that the annealing lehr could also be used to ensure a consistent strength of the vial. Portions of the material having differing rates of thermal expansion may be used to provide the break zone. For example, ink (e.g. ceramic ink) or flux or paste may be applied to the glass surface which has a different rate of thermal expansion to the glass. Expansion at the different rates may provide micro-cracks in the glass surface which provide stress raisers which initiate the crack and separation of the first vial.

It is to be appreciated that at some stage during its manufacturing, the dual vial 100 will include an access channel to the second volume 125 to include a substance (a component of the two-component composition) to be stored in the second vial 120. During the production process, the dual vial 100 may not be filled whilst it is being manufactured. The second vial 120 may therefore be provided with a removable bottom, such as in the region of the lower portion 122 of the second vial 120. In this context, the first vial may seal the second vial in that it obstructs access to the mouth. For example, where the body 121 (e.g. the cylindrical portion) meets the lower portion 122 there may be a joint or point of temporary separation. In this context, it will be appreciated that use of the phrase 'a dual vial integrally formed of a single continuous piece of glass' refers in particular to the join between the first vial 110 and the second vial 120 (i.e. in the transition zone 130). Likewise, as mentioned above with regard to manufacturing methods for creating the break zone 113, it will be appreciated that additive methods for creating the break zone 113 (i.e. inclusion of more, or a different material, are considered to fall within this definition of use of a single piece of material.

At some stage during manufacturing the bottom end may be removed for infilling of components. Once the infilling is complete, heat may be applied to the body 121 and the lower portion 122 and the join between them, so that they are sealed to form an ampoule. Heat may be applied using a flame, such as a gas flame to bond the two parts together. The join between the body 121 and the lower portion 122 may be in the form of a threaded connection such that the one may be screwed into the other to attach them together. This may enable the dual vial to be largely manufactured by a first party and then sent to a second party who fill the dual vial with the relevant components and seal it, ready for use. It is to be appreciated that depending on the nature of the join and the method by which they are joined, a single continuous piece of material may provide the entire dual vial, or it may provide the region of the dual vial above the join (i.e. the body 121 of the second vial 120 and the first vial 110).

As explained above, the open end of the vial may be heat sealed to close off the second vial. For example, with respect to FIG. 1, the body 121 and lower portion 122 may be attached to one another, such as after the dual vial has been filled with its relevant components. The cross-sections of the body 121 and the lower portion 122 may be selected so that they correspond to one another at the location at which the two are to be joined together. At this location, the two components may be heat sealed to one another, such as using a flame sealing process.

In some examples, at least one of the body 121 and the lower portion 122 has a narrowed cross-section at some point along its length. For example, the component may include a narrowed region where its cross-sectional area is less than that of its neighbouring regions (e.g. the regions on either side of the narrowing). Drawing one of the body 121 and the lower portion 122 (e.g. the body) into a neck form as such (e.g. with the narrowing) may aid in a subsequent flame sealing process. For example, the body may be tubular and progressing along its longitudinal axis there is a first, second and third location. A cross-sectional area at the first and third location may be greater than that at the second location. The narrowed region proximal to the second location comprises a neck of the body. Then, the body and the lower portion are joined, e.g. by application of heat along a path where the two components meet. As a result of the narrowing, application of heat along this path may be helped. This path may near to (e.g. at) the narrowing, or it may be further away from the narrowing, e.g. so that the resulting side profile of the body provides a better fit for matching to the lower portion but the cross-section remains similar in shape and cross-section to that of a body without a said narrowing.

It is to be appreciated that other methods may be used for sealing the dual vial. For example, e.g. with reference to FIG. 11, the open end 829 may sealed or closed using a suitable obstructive means. Obstructive means such as a stopper or a plug may be inserted into the open end to seal the dual vial. Other components may be used that fit over the top of the body of the vial and provide a seal. For example, these components may rely on a friction fit or a separate component to ensure there is a tight seal which prevents the components from exiting the dual vial. Such components for sealing the dual vial may be configured for inducing internal pressure of the vial and expelling product out the other end. For example, a valve-type arrangement, e.g. using a filling valve could be incorporated.

The above description has related to use of glass for the material. However, it is to be appreciated that other materials could be used. For example, a polymer could be used which is injection moulded to provide a dual vial, such as a dual vial having two cylindrical tubes (first and second vials). A removable lower end of the second vial of such a polymeric dual vial could be heat sealed with a crimping tool to provide an ampoule for the second volume. Alternatively and/or in addition, a polymer dual vial could be manufactured in other ways, such as using extrusion related methods.

The material used could be a metal, such as aluminium. It is to be appreciated that metals could be mechanically formed into the selected shape for the dual vial, e.g. using mechanical forming tools. A removable bottom portion of the second vial could be mechanically crimped closed to allow the second vial to form an ampoule.

Each of the first and second vial have been described as being circular in cross-section, and having a cylindrical or bullet-like shape. However, it is to be appreciated that other shapes could be used. For example, a tapered body could be used for either or both of the first and second vials so that the diameter decreases in one direction, i.e. towards the bottom. It is to be appreciated that the first vial may be conical. Either vial may be domed (e.g. having an arch cross-section). The shape and dimensions of the first and second vial may be selected based on the composition they are going to contain. For example different ratios of volumes of the first and second vials could be used. In some examples, the first vial could be flat or disc shaped below the mouth.

It is to be appreciated that the terms ‘frangible’ and ‘breakable’ have been used interchangeably to describe the same functionality of the first vial.

It will be appreciated in the context of the present disclosure that the first vial and the second vial may be provided by separate pieces of material which may be joined together, e.g. by a weld. In such a case the piece of material may be continuous, but it comprises two pieces fused together at the weld. It is not necessary that the dual vials of the present disclosure comprise a single piece of material.

It will be appreciated in the context of the present disclosure that in the embodiments which comprise a single continuous piece of material arranged to provide both the first vial and the second vial that same, single, continuous piece of material provides not only the first vial and the second vial but also links the two vials together. This link between the two vials can only be broken by breaking that piece of material—i.e. irreversibly. Generally this will take place at the break zone.

It is to be appreciated that use of the term “circular” does not require a perfect circle. For example, a circular cross-section may be a slightly oval cross-section. For example, “circular” may refer to something which is predominantly circular, such as a consequence of a forming process.

It is to be appreciated that the term “snap”, “separate”, “break” or “cleave” may be used interchangeably. For example, this may be the case with regard to the break zone of the first vial, e.g. when it “snaps” in response to a force being applied to the first vial.

The term “closed path” has been used to describe exemplary features of the break zone. It is to be appreciated that this term may encompass paths which are not truly closed or complete in the mathematical sense. For example, it may include a path which extends around a majority of the portion of a circumference of the first vial. The path may not be completely continuous, such as it may be made up of multiple sections which follow a trajectory around the first vial. The break zone may extend around enough of a path around the first vial so that said break zone enables the first vial to separate from the second vial at that break zone in response to a force above a selected threshold being applied to the first vial.

It is to be appreciated that scanning a laser beam across a surface (e.g. of the first vial) may comprise any relative movement of said surface relative to the laser. For example, scanning may include the surface being moved in front of a stationary laser. Scanning may include moving a laser along a surface of a stationary component (e.g. the first vial). Scanning may include a combination of movement of both components to provide relative movement. For example, where the vial is in a form which is circular in cross-section, relative movement of the laser relative to the vial may include the vial may be rotated about its longitudinal axis.

The term “force” has been used to describe the first vial separating from the second vial in response to a force above a selected threshold being applied to the first vial. It is to be appreciated that in this context said “force” may be applied by any suitable means. For example, the force may be applied by raising the internal pressure of the vial.

The embodiments shown in the Figures are merely exemplary, and include features which may be generalised, removed or replaced as described herein and as set out in the claims. The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention.

Other examples and variations of the disclosure will be apparent to the skilled addressee in the context of the present disclosure.

The invention claimed is:

1. A method of packaging a two component composition into a dual vial, wherein the dual vial comprises a single continuous piece of material arranged to provide both a first vial and a second vial, the method comprising:

providing a second component of the composition into a volume, of the second vial, surrounding the first vial;

providing a first component of the composition into the first vial, wherein a wall of the first vial is provided by a first part of the single continuous piece of material and a wall of the second vial is provided by a second part of the single continuous piece of material separate from the first part;

wherein the first part is disposed in and surrounded by the second part;

wherein the wall of the first vial is connected to the wall of the second vial second vial at a transition zone wherein, at the transition zone, the first vial has a diameter substantially equal to a diameter of the second vial and a break zone in the wall of the first vial is disposed at the transition zone, wherein the first vial is frangible from the second vial at the break zone, thereby to open the first vial into the second vial without breaking the second vial;

the method further comprising closing the first vial and the second vial.

2. The method of claim 1 wherein closing the second vial comprises heat sealing an opening of the second vial to provide a hermetic ampoule containing the second component.

3. The method of claim 2 wherein the continuous piece of material is glass.

4. The method of claim 3 comprising securing a dispenser interface to a mouth of the first vial.

5. The method of claim 4 wherein the dispenser interface provides access to the internal volume of the second vial through a breaking of the first vial.

6. The method of claim 1 wherein the first vial and the second vial are formed from a single piece of the same material.

7. The method of claim 6 wherein forming comprises heat softening said material.

8. The method of claim 1 wherein the first vial seals an end of the second vial.

9. The method of claim 1 comprising forming weakened portions in the break zone of the wall of the first vial.

10. The method of claim 9 wherein the break zone separates the first vial from the second vial.

11. The method of claim 10 wherein the wall of the first vial comprises a portion having a circular cross-section, and the break zone lies circumferentially around the cylindrical wall.

12. The method of claim 10 wherein forming weakened portions comprises applying a laser to the break zone.

13. The method of claim 12 wherein the laser is applied to cause laser filamentation within the wall of the first vial and/or a laser ablation on and/or within the wall of the first vial.

14. The method of claim 1, further comprising forming, from the single continuous piece of material, the dual vial.

15. The method of claim 1 wherein the transition zone comprises a fixed portion which is substantially cylindrical and concentric with the second vial.

16. The method of claim 15, wherein the fixed portion is configured to couple the first vial within the second vial.

17. The method of claim 1, wherein the first vial defines a first void separate from a second void defined by the second vial, and wherein the first void is mounted within the second void.

18. The method of claim 1, wherein the first vial is contained entirely within the second vial.

* * * * *